(12) United States Patent
Dillon

(10) Patent No.: US 6,579,563 B1
(45) Date of Patent: Jun. 17, 2003

(54) FLUID DISPENSER WITH FLUID WEIGHT MONITOR

(75) Inventor: John C. Dillon, Lorain, OH (US)

(73) Assignee: Nordson Corporation, Westlake, OH (US)

(*) Notice: Subject to any disclaimer, the term of this patent is extended or adjusted under 35 U.S.C. 154(b) by 175 days.

(21) Appl. No.: 09/698,592

(22) Filed: Oct. 27, 2000

(51) Int. Cl.$^7$ .............................................. B05D 1/00
(52) U.S. Cl. ................... 427/8; 118/688; 118/692; 118/708; 118/712; 222/55; 222/59; 222/61; 222/63; 239/68; 239/69; 239/75; 239/99
(58) Field of Search .................... 427/8; 118/688, 118/692, 712, 708; 162/262, 263, 265, 198; 222/55, 59, 61, 63; 239/68, 69, 75, 99

(56) References Cited

U.S. PATENT DOCUMENTS

| | | | |
|---|---|---|---|
| 4,381,730 A | * 5/1983 | Arthur | 118/325 |
| 4,448,736 A | * 5/1984 | Emery et al. | 264/211 |
| 4,830,219 A | 5/1989 | Siemann | 222/55 |
| 5,048,754 A | * 9/1991 | Rich | 118/300 |
| 5,310,573 A | * 5/1994 | Tanokuchi et al. | 118/249 |
| 5,481,260 A | 1/1996 | Buckler et al. | 340/870.09 |
| 5,687,092 A | * 11/1997 | Bretmersky et al. | 118/683 |
| 5,718,852 A | * 2/1998 | Campbell et al. | 264/40.1 |
| 5,808,559 A | 9/1998 | Buckler | 340/870.09 |
| 5,999,106 A | 12/1999 | Buckler | 340/870.09 |
| 6,010,740 A | * 1/2000 | Rutledge et al. | 118/321 |

FOREIGN PATENT DOCUMENTS

| | | |
|---|---|---|
| EP | 1037023 | 9/2000 |
| GB | 2161941 | 1/1986 |

* cited by examiner

*Primary Examiner*—Shrive P. Beck
*Assistant Examiner*—Kirsten Crockford Jolley
(74) *Attorney, Agent, or Firm*—Wood, Herron & Evans, L.L.P.

(57) ABSTRACT

A fluid dispensing system for monitoring a weight of a fluid dispensed by a fluid dispenser. A first monitoring device determines a first flow characteristic, for example, pressure, of the pressurized fluid flowing through the fluid dispenser; and a second monitoring device determines a second flow characteristic, for example, viscosity, of the pressurized fluid flowing through the fluid dispenser. A monitor control produces an output representing a weight of the fluid dispensed by the fluid dispenser as a function of the first and second flow characteristics. The monitor control also stores values relating to a size of an orifice through which the pressurized fluid is dispensed and a density of the pressurized fluid. The weight value is determined as a function of the orifice size and the density values. The present invention also includes a method of monitoring a weight of a fluid being dispensed by a fluid dispenser.

11 Claims, 5 Drawing Sheets

FLUID DISPENSER WITH FLUID WEIGHT MONITOR

FIELD OF THE INVENTION

The present invention generally relates to fluid dispensing and more particularly, to an improved fluid dispensing system including a weight monitor.

BACKGROUND OF THE INVENTION

Known fluid dispensing systems include a pump with an inlet connected to a supply of material and a discharge connected to a fluid dispenser. For precision dispensing, the dispenser normally includes a valve which permits fluid to pass through a discharge opening such as a spray nozzle or fluid tip. In some systems, the dispenser valve is operated by a program controlled device so that fluid is dispensed in precise or metered amounts.

In many applications it is often desirable that precise patterns, metered amounts or both be dispensed. Further, in order to optimize the use of the material being sprayed, it is desirable that a constant amount of material be deposited on the object of interest. For example, in precision dispensing systems used to apply a coating of material on surfaces of can bodies, the user normally specifies the amount of material to be deposited by its weight, for example, 160 milligrams ("mg") of material per can. With known systems, given a desired weight and density of material to be deposited, the flowrate of material expected to be discharged from the nozzle can be determined from the size of the nozzle orifice and estimates of the nozzle pressure and the viscosity of the material. Given an expected flowrate, the time the dispensing nozzle is held open to dispense the desired weight of material can also be determined.

While such systems have proven to provide an acceptable performance, there is a continuing effort to improve the system's performance. Can bodies are typically coated during the manufacturing process at rates of up to several hundred cans per minute. Further, any changes in the variables used to determine the expected flowrate, e.g., the coating material viscosity, will affect the flowrate of material through the nozzle and thus, the weight of material used to coat the can body. Such variations in the weight of the coating material used have a significant impact on manufacturing costs. For example, if the weight of the coating material is greater than a specified weight, more coating material than required is being used. When the value of that excess material is accumulated over thousands or millions of cans being coated, it adds up to a very significant cost. Obviously, there is a need to reduce the unnecessary cost of applying excess coating material to a can or other object. In the other extreme, if there is too little coating material used in the process, the result is improperly coated cans. An improperly coated can may have an adverse effect on the can's ability to function for storage. In some cases, the can may suffer accelerated deterioration (i.e., shortened shelf life), and in others (e.g. for foods and beverages) the contents may be adversely affected (e.g., taste, spoilage). Improper coating, therefore, is undesirable and adds substantial expense because improperly coated cans must be rejected and disposed of, or reprocessed by inspecting, hand sorting, cleaning and recoating.

Thus, there is a need for an improved fluid dispensing system in which variations in the coating material being dispensed and applied can be automatically detected and addressed.

SUMMARY OF THE INVENTION

The present invention provides a fluid dispensing system with an improved monitoring of the quality of the fluid dispensing process. The fluid dispensing system of the present invention has a monitoring system providing an early indicator of a potential problem in a coating line, thereby providing a higher quality finished coated product. The fluid dispensing system of the present invention can be used to prevent first, the use of excessive coating material, thereby reducing manufacturing costs, and second, the use of too little coating material, thereby improving the quality of the finished coated product. Further, the present invention permits deviations in the fluid dispensing process to be corrected prior to a large number of faulty coatings occurring, thereby providing a more efficient and economical fluid coating line. Thus, the fluid dispensing system of the present invention is especially useful in coating line applications where a large number of objects are being coated over successive fluid dispensing cycles.

In accordance with the principles of the present invention and the described embodiments, a fluid dispensing system is provided for monitoring a weight of a fluid dispensed by a fluid dispenser. A first monitoring device determines a first flow characteristic of the pressurized fluid flowing through the fluid dispenser, and a second monitoring device determines a second flow characteristic of the pressurized fluid flowing through the fluid dispenser. A monitor control produces an output representing a weight of the fluid dispensed by the fluid dispenser as a function of the first and second flow characteristics.

In one aspect of the invention, the first and second monitoring devices are pressure and viscosity monitoring devices. Further, the fluid dispenser is operated over intervals of time; and the monitor control produces pressure and viscosity values of the pressurized fluid flowing through the fluid dispenser during an interval of time.

In a further aspect of the invention, the monitor control stores a value related to a size of an orifice in the fluid dispenser through which the pressurized fluid is dispensed; and the monitor control produces a volume value representing a volume of fluid flowing through the fluid dispenser during the interval of time as a function of the size of the orifice. The monitor control also stores a value related to a density of the pressurized fluid and produces the output representing the weight of fluid dispensed by the fluid dispenser during the interval of time as a function of the density value.

In another embodiment, the present invention includes a method of monitoring a weight of a fluid being dispensed by a fluid dispenser. In the method, a fluid dispenser executes a fluid dispensing cycle to apply a fluid coating to an object. First and second flow characteristics of the fluid dispensed by the fluid dispenser during the fluid dispensing cycle are then determined; and thereafter, a weight of the fluid dispensed by the fluid dispenser during the fluid dispensing cycle is determined as a function of the first and second flow characteristics.

In an aspect of this invention, the first and second flow characteristics are the pressure and viscosity of the fluid dispensed by the fluid dispenser during the fluid dispensing cycle.

Various additional advantages, objects and features of the invention will become more readily apparent to those of ordinary skill in the art upon consideration of the following detailed description of the presently described embodiments taken in conjunction with the accompanying drawings.

DETAILED DESCRIPTION OF THE INVENTION

Figure 1:
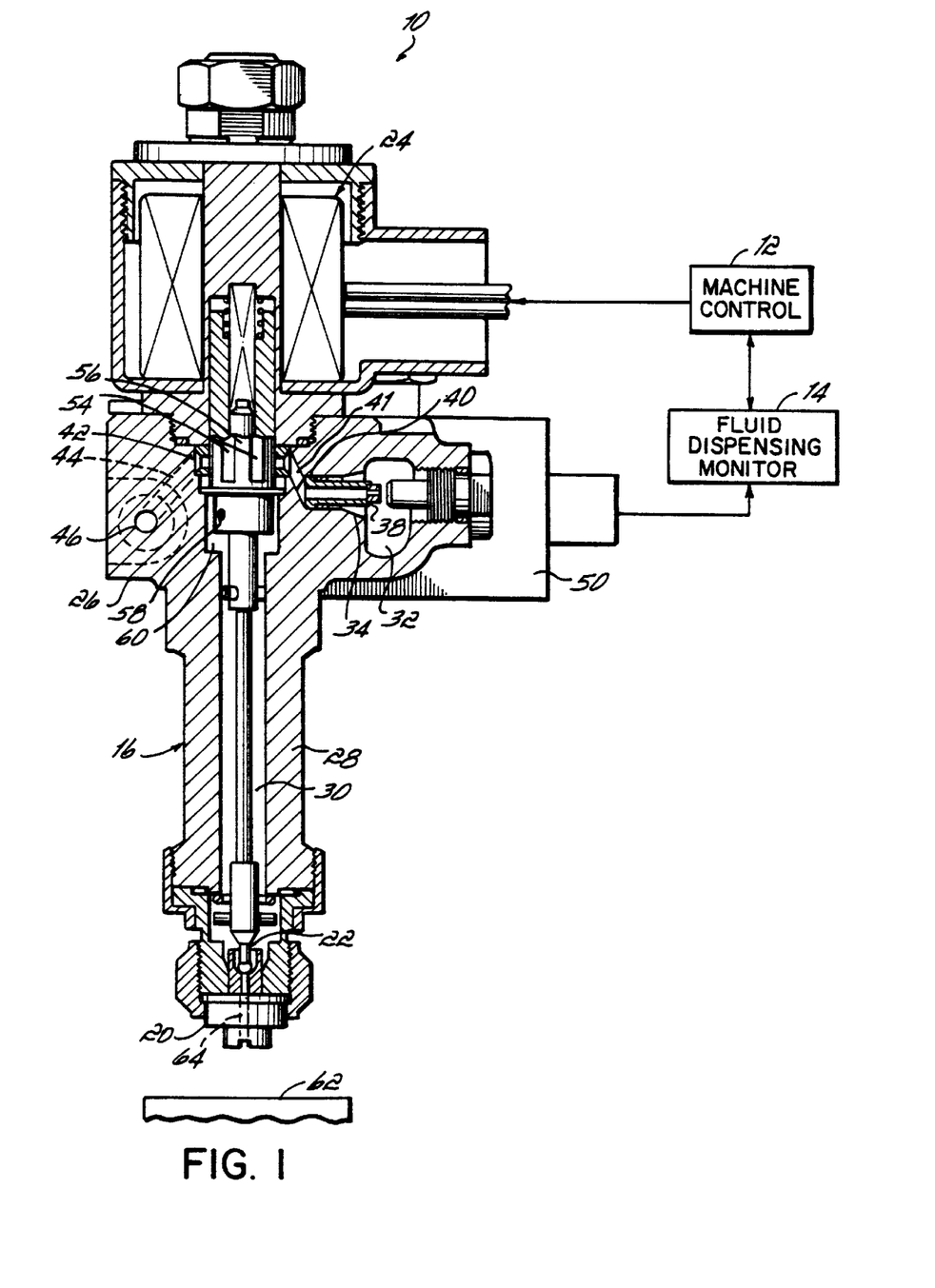
FIG. 1 is a cross-section view of a fluid dispensing gun utilized with the present invention.

FIG. 1 illustrates a known fluid dispensing gun 10, one or more of which may be used on coating lines to spray or dispense fluid on objects, such as cans, being conveyed past the guns. In the FIG. 1 embodiment, the gun 10 is an A20A model gun manufactured by Nordson Corporation of Amherst, Ohio. Alternatively, an MEG gun available from Nordson Corporation could be used. An MEG gun as shown in U.S. Pat. No. 5,791,531. One advantage of the MEG gun over the A20A gun is that the MEG gun opens and closes faster. Therefore, the open time of the gun could be determined reasonably accurately from the pressure changes in the fluid and the gun. When the gun opens, the fluid pressure sharply drops. When the gun closes, the fluid pressure sharply rises again. Each fluid dispensing gun is operatively connected in a known manner to a machine control 12 and the fluid dispensing monitor 14 of the present invention. The machine control 12 is responsive to various process conditions for controlling the operation of the fluid dispensing gun. For purposes of this description, the machine control 12 refers collectively to one or more control units associated with the fluid dispensing gun, a source of pressurized fluid, a conveyor monitoring mechanism or other device which may provide input signals to, or accept output signals from, the fluid monitor 14. The fluid dispensing monitor 14 monitors a characteristic of fluid flow, for example, fluid pressure, within the gun 10 both during the times the machine control 12 turns the gun 10 ON and OFF. The fluid dispensing monitor 14 produces fluid flow condition signals which are displayed to an operator.

Generally, the fluid dispensing gun 10 is comprised of a body 16 through which fluid is supplied to a nozzle 20 at one end of the body 16. The opening and closing of a valve 22 is controlled by a solenoid 24 mounted on an opposite end of the body 16. The body 16 comprises a ported body block 26 connected to a body extension 28. The body block 26 has a throughbore 30 which is counterbored and threadedly connected to the housing for the solenoid 24. The axial throughbore 30 is in fluid communication with, and connected by internal passages to, the fluid inlet port passage 32 which is connected to a source of pressurized fluid 202 shown schematically in FIG. 2. The fluid inlet port passage 32 is connected to one end of a connecting passage 34 into which is mounted a calibrated orifice plate 38. The other end 40 of the connecting passage 34 is connected by an intermediate passage 41 to a first fluid flow chamber 42 which provides fluid communication between the other end 40 of the connecting passage 34 and a pressure take off fluid passage 44. The fluid passage 44 is connected to the transducer mounting passage 46 to which a sensor, for example, a pressure transducer 50, is mounted. The pressure transducer 50 includes a pressure sensor and a signal amplifier and produces a pressure signal that is less susceptible to noise, for example, pressure transmitter model LV commercially available from Sensotec of Columbus, Ohio. As noted above, for an MEG gun, the pressure signal from sensor 50 could be used to indicate the open time of the gun.

In response to various input signals, the machine control 12 provides ON and OFF signals to the solenoid 24 which respectively opens and closes the valve 22, thereby turning the fluid dispensing gun 10 ON and OFF. When the gun is turned ON, fluid flows through the inlet port passage 32 and through the calibrated orifice plate 38. If the flow related parameters, for example, the static pressure, the condition of the control valve, the gun orifice size, etc., are within specification, the calibrated orifice plate 38 provides a small pressure drop thereacross, preferably at least 50 pounds per square inch ("psi"). Therefore, the pressure in the first fluid flow chamber 42 which is measured by the pressure transducer 50 is equal to the static supply or regulated static pressure less the pressure drop across the calibrated orifice; and that measured pressure will change as a function of changes in the flow related parameters. Fluid then passes through openings 54 in the armature 56 of the solenoid valve 24. The openings 54 are connected by internal passages with armature ports 58 which open into a second fluid flow chamber 60. Consequently, fluid flowing through the calibrated orifice plate 38 flows through the first chamber 42, through the armature 56 via openings 54 and ports 58 and into a second chamber 60. Thereafter, the fluid is conducted through the throughbore 30, through the valve 22 and out the nozzle 20 to coat an object 62, for example, a can, proximate the nozzle 20.

When the solenoid 24 is energized, it opens the flow control valve 22, thereby turning the gun 10 ON; and the calibrated orifice plate 38 produces a pressure drop within the flow chambers 42, 60 of the fluid dispensing gun 10. That pressure drop is easier to measure than trying to measure variations in the parameters themselves. When the gun is turned ON, the measured pressure within the first fluid flow chamber 42 is, for purposes of this application, referred to as the "firing pressure" and is equal to the set static pressure less the firing pressure drop across the orifice plate. Under normal flow conditions and given a static pressure of, for example, 800 psi, the calibrated orifice will produce a firing pressure drop of at least 50 psi; and therefore, a normal firing pressure will be approximately 750 psi.

When the flow control valve 22 is opened, if the nozzle 20 is clogged and flow through the nozzle 20 is diminished, the firing pressure will be higher than normal and the pressure drop will be less. This higher firing pressure value is detected by the fluid dispensing monitor 14. Similarly, as the nozzle 20 becomes worn and the fluid flow therethrough increases, the firing pressure decreases; and the pressure drop across the calibrated orifice increases. The reduced firing pressure is detected by the fluid dispensing monitor 14. In addition, when the gun 10 is turned OFF, the pressure within the first chamber 42 is expected to be approximately equal to the static pressure of the fluid being supplied to the gun 10. Variations from expected pressures at the output of the calibrated orifice plate are detected by the transducer 50 and are analyzed by the fluid dispensing monitor 14. The fluid dispensing monitor 14 provides fluid flow condition signals and data as a function of the detected changes in the fluid pressure in the first chamber 42 which reflect variations in the fluid flow conditions through the fluid dispensing gun 10.

Figure 2:
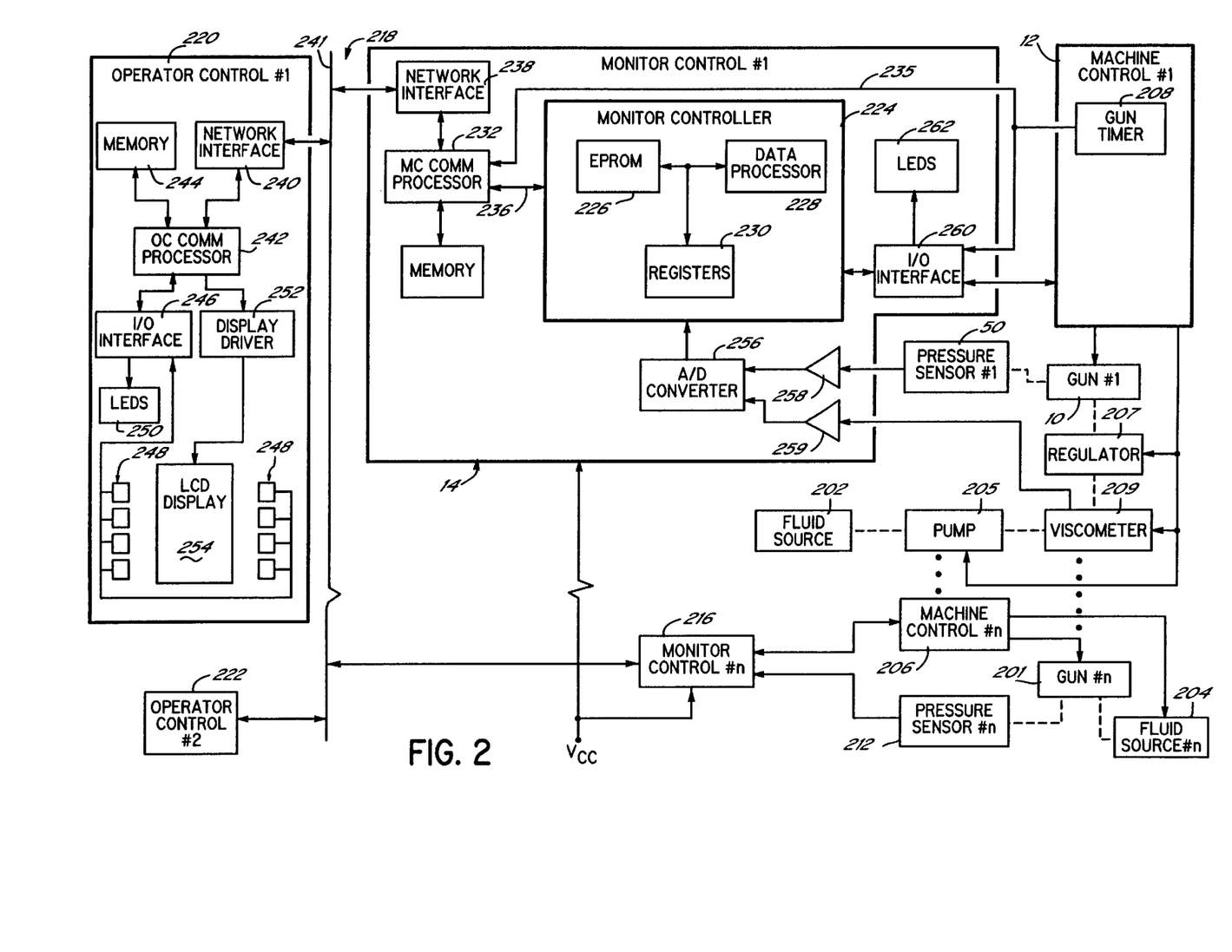
FIG. 2 is a schematic block diagram of a fluid dispensing system using the fluid dispensing gun of FIG. 1 in accordance with the principles of the present invention.

FIG. 2 is a schematic block diagram of a fluid dispensing system utilizing the present invention. Any number of fluid dispensing guns 10, 201 are connected to, and receive pressurized fluid from, fluid sources 202, 204. Each gun may have an individual fluid source or may be separately regulated from a common fluid source. In FIG. 2, a fluid dispensing source 202 provides fluid to a fluid pump 205 which, in turn, supplies a pressurized fluid to a regulator 207. The regulator supplies a regulated pressurized fluid to the dispensing gun 10. A viscometer 209 measures the viscosity of the fluid material being dispensed and provides a viscosity feedback signal to the monitor controller 224 via a signal conditioning circuit 259 and an A/D converter 256. Within a production coating system, the guns may be located adjacent a can conveyor and utilized to spray a coating on a portion of the can body, for example, the interior of the cans, as they move past the guns.

Proximity sensors (not shown) associated with each of the guns are used to detect the presence of cans prior to the cans encountering the respective guns. The proximity sensors associated with the guns 10, 201 are part of their respective machine controls 12, 206. Each of the machine controls includes a timing device such as the gun timer 208 shown in association with the machine control 12. In response to signals from the sensors indicating the presence of a can to be sprayed, the gun timers provide timing signals to the guns 10, 201 to turn the guns ON, thereby dispensing fluid therefrom-and coating the cans. After a predetermined period of time, the gun timers within the machine controls 12, 206 change the state of the timing signals to turn the guns 10, 201 OFF. During the times the guns are turned ON and OFF, sensors 50, 212, such as pressure transducers, are continuously measuring the pressure between the calibrated orifice plate and the nozzle in each of the respective guns, 10, 201.

Monitor controls 14, 216 are associated with, but located remotely from, their respective guns 10, 201. For example, each of the monitor controls may be located anywhere from several inches to 100 feet away from its respective pressure transducer and dispensing gun. The monitor controls are further connected to a communications network 218 and transmit and receive data from one or more operator controls 220, 222. Each operator 220, 222 control provides a common point at which monitored data from all of the monitor controls may be displayed to an operator; and the operator control accepts input data from the operator which may be transmitted to any of the monitor controls 14, 216. The operator control and any or all of the monitor controls may be separated by a distance of from several inches to more than 5000 feet. Therefore, in any particular system, there are many fluid dispensing guns and an equal number of associated monitor controls combined in a configuration of processing or production lines; but there are comparatively few operator controls which monitor the fluid flow conditions in the guns. Each operator control 220, 222 is capable of remotely monitoring flow conditions in all of the guns, and the operator controls may be located anywhere, for example, at one or more of the guns, at one or more processing control stations associated with respective processing lines, in a different room or in a different facility such as a process control or service center. A typical can coating plant may have two or three can coating lines with five to seven coating guns on each line.

All of the monitor controls are identical in construction and therefore, only the monitor control 14 will be described in detail. The pressure monitoring process is executed by a monitor controller 224 which is implemented by a microcontroller commercially available as PIC16C5X from Microchip Technologies, Inc. of Chandler, Ariz. The monitor controller 224 operates with a memory device, for example, an EPROM 226, for storing programmed instructions controlling the operation of a data processor 228. The data processor responds to the program instructions within the EPROM 226 to implement various timers and counters using registers 230. In addition, the registers 230 provide temporary storage for data being transferred between the monitor controller 224 and the machine control 12. Operating programs for the monitor controller 224 are written in a RISC assembly language associated with the microcontroller 224 and stored in the EPROM 226. An MC communication processor 232 communicates with the monitor controller 224 over a bidirectional link 236 which has an architecture similar to an RS-232 interface. The MC communication processor 232 may be implemented using a "NEURON CHIP" processor commercially available from Motorola, of Phoenix, Ariz. Development tools and software for the "NEURON CHIP" processor are commercially available from Echelon Corporation of Los Gatos, Calif.

The MC communication processor 232 and OC communication processor 242 exchange data in accordance with a data communications cycle and protocol determined by the "NEURON CHIP" processor. Some data, for example, the number of cans coated and the current measured pressure, is transferred from the MC communications processor 232 to the OC communications processor 242 during a continuously repeated data transfer cycle that is executed approximately every 500 milliseconds. In addition, either of the communications processors 232, 242 can initiate an asynchronous data transfer cycle with the other processor in response to an operator input or other process condition. For example, at different times determined by the operator or the process, the MC communication processor 232 transmits data to the OC communication processor 242 which may include, for example, power ON configuration data, installation data relating to the particular gun associated with the monitor control, newly generated error codes, newly calculated pressure limit information generated during the execution of a calibration mode, and the current firing and static pressures as determined by the monitor control. Further, at other times determined by the operator or the process, the OC communication processor 242 transmits data to the MC communication processor 232 which may include, for example, the current time and date, requests for data, such as diagnostic error code information resulting from an operator actuating pushbuttons 248, etc.

The MC communication processor includes its own EPROM and RAM and also communicates with external memory 234. In addition, the MC communication processor 232 communicates with the operator control 220 over the network 218 which has an RS-485 architecture. The network 218 includes a transmitter receiver network interface 238 associated with the monitor control 14 and a second transmitter receiver network interface 240 located with the operator control 220. The network interfaces 238, 240 are interconnected by a network media, or link, 241 such as four wire cable.

All of the operator controls are identical in construction to the operator control 220. Within the operator control 220, an OC communication processor 242 identical to the MC communication processor 232 is connected to an external memory 244. The OC communication processor 242 is connected to an input/output interface 246 which, in turn, is connected to pushbuttons 248 and LED displays 250. The communication processor 242 is also connected to a display driver 252 which operably communicates with a display 254 such as a liquid crystal display ("LCD") or other display mechanism. The operator may use the pushbuttons 248 on any of the operator controls 220, 222 to enter input data signals representing configuration data and set up parameters for each of the monitor controls 14, 216. A fluid dispensing control system as described above is described in more detail in U.S. Pat. No. 5,481,260 and has the same assignee as the present application and is hereby incorporated in its entirety herein.

Data entered at the operator control 220 relating to a particular monitor control is immediately transferred to that monitor control, but the data is stored in the memory associated with the operator control. Messages displayed on the LCD display 254 originate from the monitor control 14. Therefore, the OC communications processor within the operator control 220 simply communicates with either the network interface 240, the I/O interface 246 or the display driver 252 and does not execute any programs that are necessary for the monitor control 14 to perform its functions. Therefore, after the operator control is used to setup the initial operating parameters in the monitor controls, the monitor controls operate independently; and the operator controls may be disconnected from the network 218. However, the operator controls have a nonvolatile memory, for example, memory with a battery back-up, in which the configuration and setup parameters are stored for each of the guns. Therefore, in the event that a monitor control loses power or must be replaced, the operator control may be used to quickly reenter the configuration and setup parameters.

The MC communications processor 232 functions as a communication link between the network interface 238 and the monitor controller 224. In addition, the MC communications processor 232 stores and executes programs which are used to calibrate the monitor processor. The MC communications processor 232 also transmits diagnostic data stored in the memory 234 in response to requests for such data from the operator control 220. An intermittent coating system turns the gun ON and OFF with each can coated and is distinguished from a continuous coating system in which the gun is maintained ON continuously while objects to be coated are conveyed past the gun.

The monitor controller 224 samples the fluid pressure measured by the sensor 50 by periodically reading the A/D converter 256 which is connected to the sensor 50 through a signal conditioning circuit 258. The monitor controller 224 executes programs which analyze the measured pressure signals and produce fluid flow condition signals to an I/O interface 260. The I/O interface generates signals to illuminate the appropriate LEDs 262 and operate respective control circuits within the machine control 12. In addition, fluid flow condition signals produced by the monitor controller 224 represent fluid flow condition data, other flow condition data and associated message data, all of which is sent to the operator control 220. Within the operator control, the data is effective to illuminate the appropriate LEDs 250 and display messages on the display 254.

The weight of fluid material dispensed is substantially equal to the mathematical product of the density of the fluid material times the volume of the fluid material dispensed. To provide an accurate monitoring of the weight of fluid dispensed, the monitor control 14, in this embodiment, is programmed with, and stores, values relating to the density of the fluid material being dispensed. In a can coating operation, the fluid dispensed normally consists of a solvent or liquid and a solute comprised of solid particles within the solvent. The composite density of the fluid material being dispensed is a function of the densities of the solvent and the solids and the percent of solids within the solvent. The density of a particular fluid material being dispensed is substantially constant throughout the fluid dispensing process. While the densities of materials change with temperature, in the temperature ranges encountered in a fluid dispensing process, such changes in density are relatively small and, in this embodiment, are ignored. Hence, in the fluid dispensing applications of interest, the density of the solvent is assumed to be constant; and the density of the solid is assumed to be constant. Therefore, the composite density of the fluid material being dispensed is principally a function of the percent of solids used. Further, for each of the percent of solids expected to be used, a table is established associating each of the percent of solids used with a density of the composite fluid utilizing that percent of solids. That table is stored in the monitor controller 224, for example, in the EPROM 226. Alternatively, the densities of the solvent and the solids and the percent of solids can be programmed into the monitor controller 224; and the monitor controller 224 can be programmed to calculate a value of the composite density of the fluid material being dispensed.

To determine the weight of the fluid material dispensed, not only must the density be known, but the volume of fluid dispensed during a coating cycle must also be determined by the monitor control 14. The volume of material dispensed is equal to a mathematical product of the flowrate of fluid dispensed during a fluid dispensing cycle times the duration of the fluid dispensing cycle. The gun timer 208 within the machine control 12 controls the time duration that the fluid dispenser is turned on or open, and that time duration is monitored and stored by the monitor controller 224. Thus, the flowrate is the last parameter needed by the monitor control 14 to determine the weight of the fluid dispensed during a fluid dispensing or coating cycle. The flowrate is dependent on the size of the orifice of the nozzle used, the viscosity of the fluid material and the pressure with which the fluid material is being supplied. A model of flowrate of the coating fluid material being dispensed through the nozzle as suggested in prior U.S. Pat. No. 5,687,092 is expressed as follows:

$$FR = A \times P^N \times e^{b \times \Delta T}$$

where
FR=Fluid Flow Rate
P=Nozzle Pressure
A=First Flow Characteristic Constant
N=Second Flow Characteristic Constant
b=Temperature Sensitivity Factor
$\Delta t = Time_i - Time_{i-1}$ In shorter dispensing cycles it can be reasonably assumed that the temperature will remain substantially constant. Therefore, in those cycles, the change in temperature can be assumed to be zero; and the model may be simplified as follows:

$$FR = A \times P^N$$

The flowrate model requires that initial values be established for the terms or constants A and N. The A term represents a flow characteristic constant that is correlated to the relationship between the flowrate of fluid through the nozzle and nozzle pressure. Therefore, the value of A will be dependent on the viscosity of the fluid. Further, the value of A takes into effect the flow non-linearities that result from the shear effects from a given nozzle. The value of the N term is correlated to, and is more directly influenced by, the flow non-linearities caused by shear effects of the fluid flow through the nozzle. Therefore, preferably anytime a nozzle is changed or anytime the type of fluid being dispensed is changed, the values of the constants A and N should be reevaluated.

Figure 3:
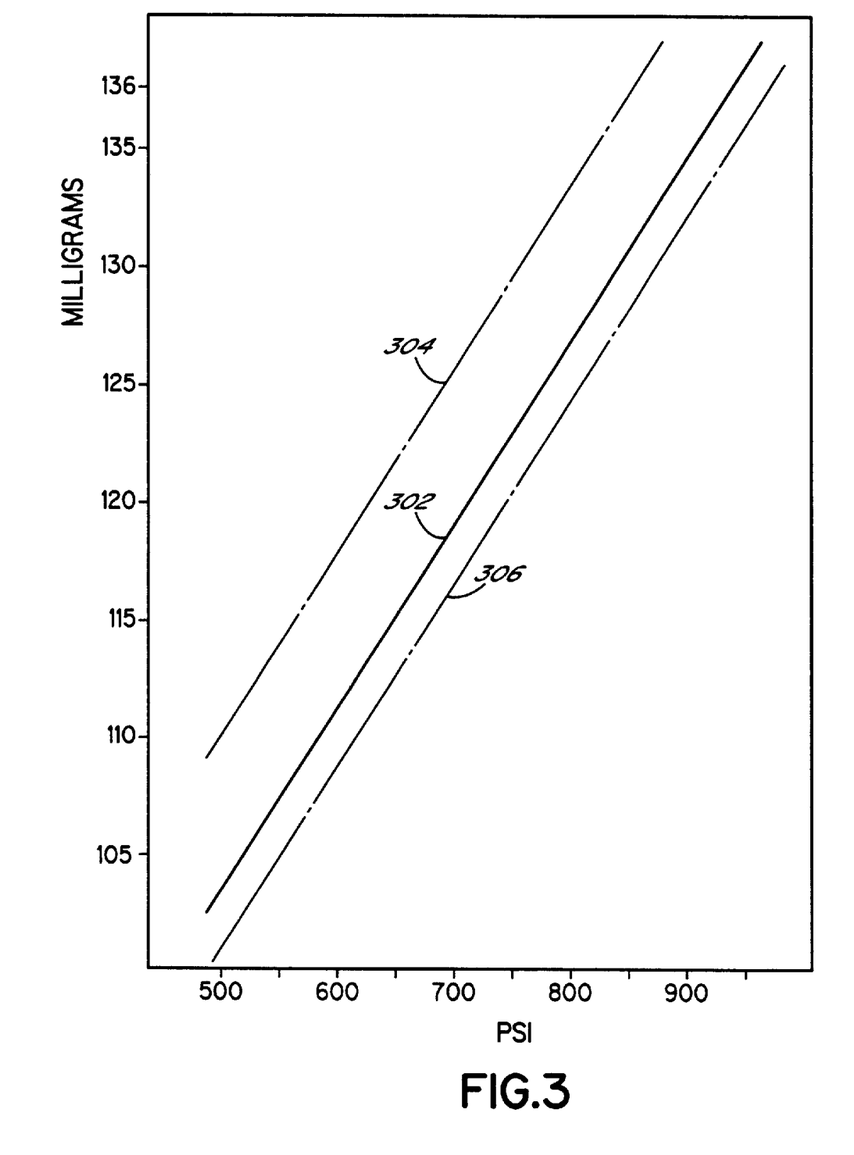
FIG. 3 is a graphical illustration of a linear fluid pressure versus fluid flow curve associated with the fluid dispensing gun of FIG. 1.

For the fluid material normally being dispensed in a can coating operation, the relationship of pressure to volume or flowrate is substantially linear as illustrated by the curve 302 in FIG. 3. Further, it should be noted that normally, changes in the ambient temperature and hence, the viscosity of the fluid being dispensed, result in the curve 302 of FIG. 3 shifting vertically along the abscissa. Thus, if the temperature increases and the viscosity decreases, the curve 302 will shift upward as shown in phantom by the curve 304. Similarly, as the temperature decreases and the viscosity of the fluid being dispensed increases, the curve 302 will shift downward as shown in phantom by the curve 306. It should be noted that as the curve 302 is shifted by changes in viscosity, the slope of the curve 302 remains substantially constant. The constant N is equal to the slope of the curve 302 as follows:

$$N = \frac{\Delta Y}{\Delta X}$$

Further, the constant A is related to the y intercept as follows:

$$A = \epsilon^{y\ intercept}$$

Thus, as viscosity changes, given a linear pressure flow relationship as shown in FIG. 3, the value of the constant A relating to the y intercept will change, whereas the constant N value can be expected to remain substantially constant.

Figure 4:
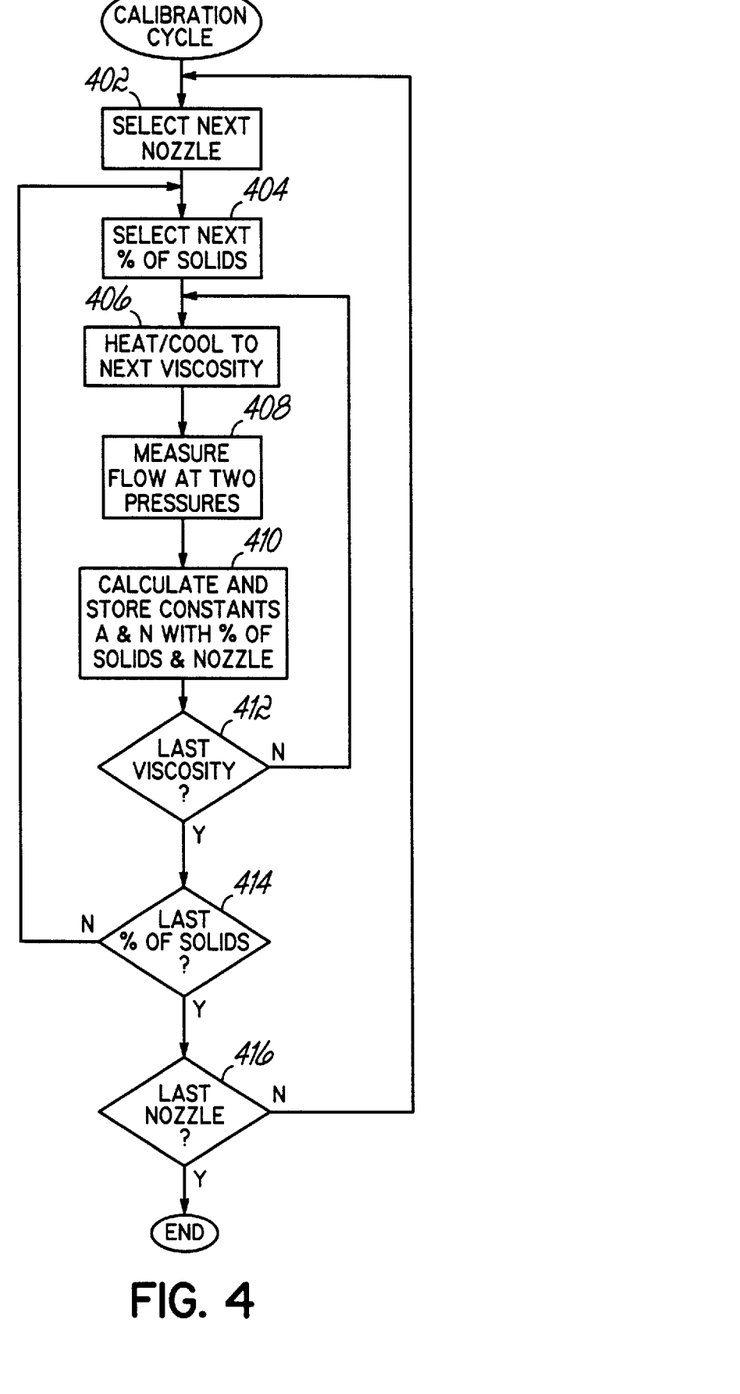
FIG. 4 is a flow chart illustrating the process steps of a calibration cycle for the fluid dispensing system illustrated in FIG. 2.

Different values of the constant A, and the constant N, if necessary, can be established during a preproduction calibration cycle in which different fluid materials are dispensed through a nozzle having a desired orifice size at different temperatures and thus, at different viscosities. As earlier described, in this application, the different fluid materials can be expressed as different percentages of solids. During the calibration cycle as illustrated in FIG. 4, a first nozzle is selected at 402, and at 404, a fluid material identified in terms of a percent of solids is then selected. Thereafter, at 406, the fluid material is heated and/or cooled to the next viscosity. The desired viscosity is determined by a viscosity feedback signal provided by the viscometer 209 (FIG. 2). Once the fluid material reaches the desired viscosity, at 408, the volume of fluid material dispensed through the selected nozzle at two different pressures is measured and recorded or stored. More data points may be chosen if desired in order to obtain a more accurate representation of the pressure-flow relationship. Then, at 410, values for the A and N constants are calculated using the relationships described earlier. The A and N values are stored in a calibration table in association with the percent of solids of the fluid being dispensed and the nozzle being used. Next, at 412, the process determines whether flow at all the viscosities have been measured. If not, the process of steps 406–410 are repeated. If so, the process, at 414, determines whether all of the percent of solids have been used; and if not, the process of steps 404–410 is repeated. In a similar manner, a calibration cycle is normally executed for each differently sized and/or shaped nozzle orifice expected to be used. When the last nozzle has been calibrated, as detected at 416, the calibration process ends. A calibration table is then established which provides, for each of the different nozzles calibrated and for each different fluid material, expressed as a percent of solids, different values for the constants A and N for different viscosity values. In addition, the calibration table also includes composite density values associated with each of the percent of solids entered. The calibration table is then read into an EPROM chip and plugged into the EPROM 226 of the monitor controller 224. Alternatively, the calibration table may be entered into an operator computer 220, 222 and transferred via the communications link 218 to the monitor controller 224 for storage. The fluid dispensing monitor 14 is now ready to monitor the weight of fluid dispensed from the dispensing gun 10 during a fluid dispensing cycle.

In use, before the start of a fluid dispensing cycle, an operator, using an operator control 220, enters values representing the nozzle being used and an identification of the fluid material being dispensed, for example, in terms of the percent of solids. Those values are stored in the monitor controller 224 along with the calibration table previously described. Thus, referring to FIG. 5, the dispensing cycle first, at 502, determines whether a nozzle and fluid material have been provided; and if not, an error message is displayed at 504. The machine control 12 monitors a proximity switch that detects an approach of a can at the dispensing gun 10 in a known manner. Upon detecting a can, at 506, the machine control 12 then, at 508, provides a signal to open the fluid dispensing gun 10 and start a fluid dispensing cycle timer. As previously described, the size of the orifice, an expected fluid dispensing pressure and the density of the fluid being dispensed are all known. Therefore, the duration or period of time required to dispense a desired weight of fluid can be determined and entered into the cycle timer. Next, at 510, the signals from the pressure transducer 50 and viscometer 209 are read and stored by the monitor controller 224 via the A/D converter 256 and respective signal conditioning circuits 258, 259. The process then, at 512, determines whether the cycle timer has timed out or expired; and at the end of the fluid dispensing cycle, at 514, the machine control 12 closes, or turns off, the dispensing gun 50.

Figure 5:
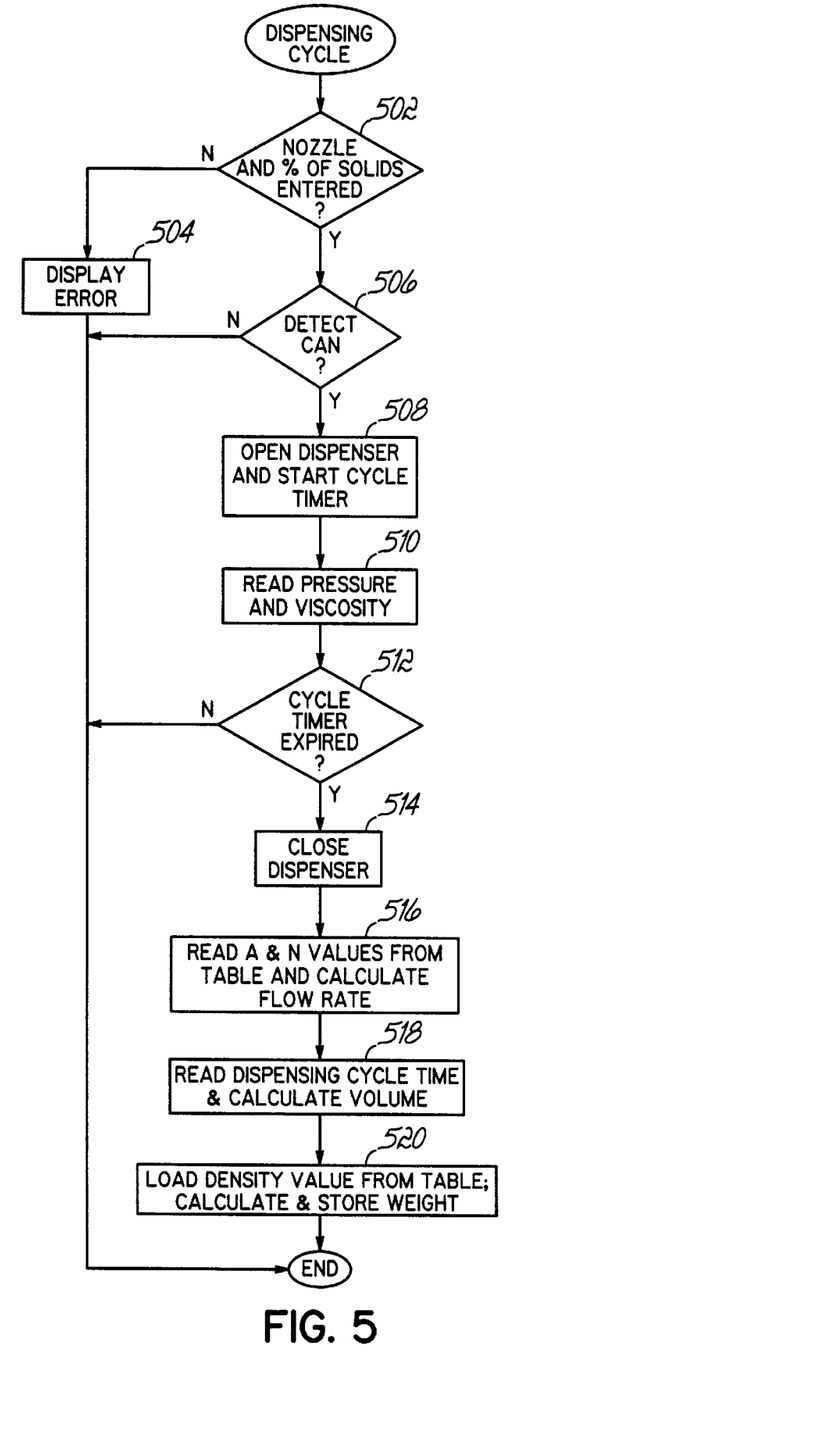
FIG. 5 is a flow chart illustrating a process for monitoring a weight of a dispensed fluid in accordance with the principles of the present invention.

Given the orifice size and percent of solids previously entered by the user and stored in the monitor controller 224, the monitor controller 224, at 516, uses a viscosity value derived from the viscosity feedback signal to read corresponding values for the constants A and N from the calibration table. Given the A and N constants and the measured pressure derived from the pressure feedback signal, the monitor controller 224, further at 516, then calculates the flowrate of the fluid material dispensed from the following:

$$FR = A \times P^N$$

The monitor controller 224 then, at 518, multiplies that flowrate value times the duration of the fluid dispensing cycle as detected from the machine control 12 via the I/O interface 260, thereby providing an indication of the volume of fluid material dispensed by the dispensing gun 10. Thereafter, at 520, using the stored input value representing the percent of solids, the monitor controller reads a corresponding density value from the stored calibration table. The monitor controller 224 then multiplies the density value times the volume of material dispensed to obtain a value representing the weight of the material dispensed during that fluid dispensing cycle.

The weight of material dispensed is then stored and either automatically, or on request, transmitted via the communications link 218 back to an operator control 220, 222 for display, reporting and/or further analysis. The fluid dispensing weight detection system as described herein provides an output representing the weight of the material dispensed during a dispensing cycle. Those weights can be plotted over time to illustrate how dispensed fluid weights correspond to a desired fluid weight. Such a plot can be used for quality control purposes. For example, if the dispensed fluid weights differ from the desired fluid weight by a predetermined amount, the fluid dispensing process can be adjusted or stopped. Alternatively, the dispensed fluid weights can be averaged and used to adjust either, the dispensing cycle time or, the dispensing pressure, so that, over time, the dispensed fluid weight remains substantially equal to a desired fluid weight. Such fluid weight control can be implemented using the monitor control 14, the machine control 12, or a combination of controls within the fluid dispensing system.

Thus, the fluid dispensing system described herein provides an early indicator of a potential problem in a fluid dispensing process, so that corrections to the fluid dispensing process can be made prior to a large number of faulty coatings occurring. By detecting a weight of a coating being dispensed with respect to one or more cans or other objects being coated, the fluid dispensing system can be controlled to provide a more consistent coating and hence, a lower cost, higher quality finished coated product. The detection of the weight of the fluid being dispensed can be used to prevent first, the use of excessive coating material, thereby reducing manufacturing costs, and second, the use of too little coating material, thereby improving the quality of the finished coated product. Thus, the detection of the weight of the fluid being dispensed can be used to provide a more efficient and economical fluid coating line.

Another alternative is that the weight value determined at 520 could be used in a closed loop system wherein it would be compared to the desired weight. If the weight is too low, the flowrate could be increased by opening up pressure regulator 207. If the weight is too high, the Flowrate could be decreased by closing down pressure regulator 207. In this way, the number of faulty coatings produced could be minimized.

While the present invention has been illustrated by a description of various described embodiments and while these embodiments have been described in considerable detail in order to describe the best mode of practicing the invention, it is not the intention of Applicant to restrict or in any way limit the scope of the appended claims to such detail. Additional advantages and modifications within the spirit and scope of the invention will readily appear to those skilled in the art. For example, in the described embodiment, the fluid dispensing system measures the weight of the fluid dispensed with each cycle of operation of the fluid dispensing gun that corresponds with the passage of a can or object past the gun. As will be appreciated, in most applications, any control over the fluid dispensing process is based on an accumulated weight of the fluid dispensed over a number of objects or cans coated. Thus, the total weight of the fluid dispensed during a dispensing cycle is detected and accumulated over a number of cans passing the fluid dispensing gun. However, in some applications, the fluid dispensing gun may be held continuously open or on, thereby dispensing the fluid on cans or other objects that are being conveyed past the open gun. Even though, the gun is not cycled on and off, the monitor control 14 can take one or more pressure and viscosity readings over a period of time during which a counted number of cans pass the fluid dispensing gun. Given that data, a weight of the fluid dispensed over the period of time can be calculated; and a weight of fluid dispensed per can be determined. Thus, the benefits of the present invention can be realized independent of the cycling of the fluid dispensing gun and can be used on a fluid coating line having a continuously operating fluid dispensing system.

Further, in the described embodiment, the relationship of pressure to volume flow or flowrate is assumed to be linear. If the relationship of pressure to volume or flowrate is nonlinear, then the values of A and N can be established by providing a more extensive analysis of the data obtained in the calibration process. In the previously described calibration process, flow through the nozzle over a constant period of time is measured in response to different pressure values. If the pressure-volume relationship is nonlinear, the monitor control 14 uses the natural log values of the measured data to approximate the best linear relationship that can be associated with the measured data and computes four natural log of pressure values as follows:

$$X_n = \ln P_{MEAS@X\%P}$$

where $P_{MEAS@X\%P}$=Average Measured Pressure at the Set % of Maximum Pressure In addition, the monitor control 14 computes four natural log of flowrate values for each of the calibration dispensing cycles as follows:

$$Y_n = \ln\left(\frac{VOL_{MEAS\ @\ X\ \%\ P}}{DISPENSE\ TIME\ @\ X\ \%\ P}\right)$$

where $VOL_{MEAS@X\%}$=Measured Volume at the Set % of Maximum Pressure

Two-dimensional data coordinate values are defined by each of the four natural log of pressure values and a corresponding one of the four natural log of flowrate values. The monitor control 14 then performs a linear regression on the sets of coordinate values, for example, a least squares regression, to identify a straight line represented by the computed data points. Next, the monitor control 14 sets a value of the constant N equal to the slope of the straight line identified, at 310, as follows:

$$N = \frac{\Delta Y_n}{\Delta X_n}$$

The monitor control 14 also determines a calibration value for the constant A as follows:

$$A = e^{y\ intercept}$$

The monitor control 14 stores the calibrated values of the constants A and N, and the control 22 is ready to begin a production cycle.

In the described embodiment of the invention, a viscometer 209 is used to measure viscosity during a dispensing cycle. As will be appreciated, a change in viscosity can also be detected by detecting a difference in measured flows from one dispensing cycle to another. Such a viscosity detection system is fully described in U.S. Pat. No. 5,687,092, is assigned to the same assignee as the present application and is hereby incorporated by reference in its entirety herein.

In addition, in the described embodiment, the effect of temperature on the density of the fluid material being dispensed is assumed to be very small and is therefore ignored. However, as will be appreciated, the change in densities of the fluid material may be accounted for by creating a temperature/density table in the monitor control 14 that relates different temperature values to different densities of the different fluid materials as a percent of solids. In use, a temperature sensor is used to monitor the temperature of the fluid material being dispensed; and given a percent of solids input from the user, the temperature/density table used to determine the density of the fluid material being dispensed. The effects of temperature on the calculation of flowrate is thoroughly described in the above incorporated U.S. Pat. No. 5,687,092.

Therefore, the invention in its broadest aspects is not limited to the specific detail shown and described. Consequently, departures may be made from the details described herein without departing from the spirit and scope of the claims which follow.

What is claimed is:

1. A method of monitoring a weight of a fluid being dispensed onto an object comprising:

dispensing the fluid onto the object;

determining a pressure flow characteristic of the fluid during the dispensing step;

determining, independent of the pressure flow characteristic, a viscosity flow characteristic of the fluid during the dispensing step;

determining a flowrate of the fluid as a function of the independent pressure and viscosity flow characteristics; and determining a weight of the fluid as a function of the flowrate of the fluid.

2. The method of monitoring weight of a fluid of claim 1 further comprising determining a volume of the fluid dispensed by the fluid dispenser during the fluid dispensing cycle as a function of the flowrate of the fluid dispensed.

3. The method of monitoring weight of a fluid of claim 2 further comprising:

storing a value representing a size of an orifice in the fluid dispenser through which the fluid is dispensed; and determining a volume of the fluid dispensed as a function of the size of the orifice.

4. The method of monitoring weight of a fluid of claim 2 further comprising determining a weight of the fluid dispensed as a function of the volume of the fluid dispensed.

5. The method of monitoring weight of a fluid of claim 3 further comprising:

storing a value representing a density of the fluid; and determining a weight of the fluid dispensed as a function of the volume and the density of the fluid dispensed.

6. A fluid dispensing system for monitoring weight of a fluid dispensed by a fluid dispenser comprising:

a fluid dispenser adapted to receive a pressurized fluid, said fluid dispenser dispensing the pressurized fluid over successive intervals of time;

a pressure monitoring device in fluid communication with the pressurized fluid for producing a signal representing a pressure of the pressurized fluid flowing through said fluid dispenser;

a viscosity monitoring device in fluid communication with the pressurized fluid for producing a viscosity signal representing a viscosity of the pressurized fluid flowing through said fluid dispenser; and a monitor control operatively connected to said pressure and viscosity monitoring devices and including a memory for storing a density value of the pressurized fluid, said monitor control producing an output representing a weight of the fluid dispensed by said fluid dispenser during an interval of time in response to said pressure and viscosity signals and said density value.

7. The fluid dispensing system of claim 6 wherein said monitor control comprises a memory for storing a value related to a size of an orifice in said fluid dispenser through which the pressurized fluid is dispensed and said monitor control produces a volume value representing a volume of fluid flowing through said fluid dispenser during the interval of time as a function of the size of the orifice.

8. The fluid dispensing system of claim 6 wherein said monitor control produces pressure, viscosity, volume and weight values for successive intervals of time, thereby monitoring the weight of the pressurized fluid dispensed from said fluid dispenser during each of the successive intervals of time.

9. A fluid dispensing system for monitoring a weight of a fluid dispensed by a fluid dispenser comprising:

a fluid dispenser adapted to receive a pressurized fluid, said fluid dispenser dispensing the pressurized fluid over successive intervals of time;

a pressure gage in fluid communication with the pressurized fluid and providing a pressure feedback signal representing a pressure of pressurized fluid flowing through said fluid dispenser;

a viscometer in fluid communication with the pressurized fluid, said viscometer providing a viscosity feedback signal independent of said pressure feedback signal and representing a viscosity of pressurized fluid flowing through said fluid dispenser; and a monitor control connected to said pressure gage and said viscometer and producing a flowrate value in response to said independent pressure and viscosity feedback signals, and then a weight value in response to said flowrate value, said weight value representing a weight of the pressurized fluid dispensed by said fluid dispenser during one of the intervals of time.

10. A method of monitoring weight of a fluid being dispensed by a fluid dispenser comprising:

initiating a flow of the fluid through the fluid dispenser;

measuring a pressure of the fluid flowing through the fluid dispenser;

measuring, independent of the pressure, a viscosity of the fluid flowing through the fluid dispenser;

terminating the flow of fluid through the dispenser;

determining a flowrate of the fluid dispensed by the dispenser as a function of the pressure and viscosity of the fluid; and determining a weight of the fluid dispensed by the dispenser as a function of the flowrate of the fluid.

11. A method of monitoring weight of a fluid being dispensed by a fluid dispenser comprising:

periodically operating a fluid dispenser to execute fluid dispensing cycles;

periodically determining pressure values of the fluid being dispensed by the fluid dispenser during the fluid dispensing cycles;

periodically determining, independent of the pressure values, viscosity values of the fluid being dispensed by the fluid dispenser during the fluid dispensing cycles;

periodically determining flowrate values of the fluid being dispensed by the fluid dispenser during the fluid dispensing cycles as a function of respective pressure and viscosity values; and periodically determining weights of the fluid dispensed by the fluid dispenser during the fluid dispensing cycles as a function of respective flowrate values.

* * * * *